United States Patent
Koh et al.

(10) Patent No.: US 12,172,283 B2
(45) Date of Patent: Dec. 24, 2024

(54) SETTING DEVICE AND SETTING METHOD FOR SELF-DRILLING ANCHOR BOLT

(71) Applicant: Hilti Aktiengesellschaft, Schaan (LI)

(72) Inventors: Gaisheng Koh, Shanghai (CN); Linda Xu, Shanghai (CN); Liang Lu, Zj (CN)

(73) Assignee: Hilti Aktiengesellschaft, Schaan (LI)

(*) Notice: Subject to any disclaimer, the term of this patent is extended or adjusted under 35 U.S.C. 154(b) by 44 days.

(21) Appl. No.: 18/009,556

(22) PCT Filed: Jun. 16, 2021

(86) PCT No.: PCT/EP2021/066250
§ 371 (c)(1),
(2) Date: Dec. 9, 2022

(87) PCT Pub. No.: WO2022/002594
PCT Pub. Date: Jan. 6, 2022

(65) Prior Publication Data
US 2023/0211486 A1      Jul. 6, 2023

(30) Foreign Application Priority Data

Jun. 30, 2020   (CN) .......................... 202010614634.1

(51) Int. Cl.
| | |
|---|---|
| *B25D 17/02* | (2006.01) |
| *E21D 21/00* | (2006.01) |
| *F16B 13/00* | (2006.01) |

(52) U.S. Cl.
CPC ......... *B25D 17/02* (2013.01); *E21D 21/0033* (2013.01); *E21D 21/0053* (2016.01); *F16B 13/002* (2013.01); *B25D 2222/72* (2013.01)

(58) Field of Classification Search
CPC . E21D 21/0053; B23B 31/101; B23B 31/008; B23B 2260/136; F16B 13/002; B25D 17/02; B25D 2222/72
See application file for complete search history.

(56) References Cited

U.S. PATENT DOCUMENTS

| | | | |
|---|---|---|---|
| 4,401,172 A * | 8/1983 | Kessler | ................. E21B 10/325 |
| | | | 175/283 |
| 5,085,546 A | 2/1992 | Fischer et al. | |
| (Continued) | | | |

FOREIGN PATENT DOCUMENTS

| | | |
|---|---|---|
| CN | 1176351 A | 3/1998 |
| CN | 1382243 A | 11/2002 |
| (Continued) | | |

OTHER PUBLICATIONS

International Search Report of PCT/EP2021/066250 dated Oct. 18, 2021.

*Primary Examiner* — Thomas M Wittenschlaeger
(74) *Attorney, Agent, or Firm* — Davidson Kappel LLC

(57) ABSTRACT

A setting device for a self-drilling anchor bolt of the present invention includes: a drive shaft, one end thereof having a shank for connecting to an impact tool, and another end being a setting part for pushing the self-drilling anchor bolt axially; a coupling, partially surrounding the drive shaft along an axis, and being supported on the drive shaft in such a way as to be incapable of relative rotation while being axially moveable at least locally; and a releasable locking component, disposed between the drive shaft and the coupling; in a locked position, the locking component is coupled to an extremity of an anchor rod such that the anchor rod is fed axially with rotational striking into a receiving material, and in a released position, the drive shaft strikes a sleeve to advance axially along the anchor rod and expand at an expansion part.

11 Claims, 6 Drawing Sheets

(56) References Cited

U.S. PATENT DOCUMENTS

| | | | |
|---|---|---|---|
| 6,012,358 A * | 1/2000 | Lins | ........................ B25B 31/00 |
| | | | 81/176.15 |
| 6,309,159 B1 | 10/2001 | Weaver et al. | |
| 2006/0067803 A1 | 3/2006 | Hsu | |
| 2006/0263167 A1 | 11/2006 | Linka et al. | |
| 2012/0222876 A1 | 9/2012 | Schmidt et al. | |
| 2015/0290722 A1 | 10/2015 | Foser et al. | |
| 2019/0275653 A1* | 9/2019 | Nguyen | ................ F16B 13/002 |

FOREIGN PATENT DOCUMENTS

| | | |
|---|---|---|
| CN | 1795336 A | 6/2006 |
| CN | 1968778 A | 5/2007 |
| CN | 101054901 A | 10/2007 |
| CN | 102653050 A | 9/2012 |
| CN | 204397839 U | 6/2015 |
| CN | 104797383 A | 7/2015 |
| CN | 105864253 A | 8/2016 |
| CN | 205614605 U | 10/2016 |
| CN | 109963693 A | 7/2019 |
| CN | 109973484 A | 7/2019 |
| DE | 3914881 A1 | 11/1990 |
| EP | 1350965 A2 | 10/2003 |
| JP | 2006169751 A | 6/2006 |
| WO | WO 2018091313 A1 | 5/2018 |

\* cited by examiner

SETTING DEVICE AND SETTING METHOD FOR SELF-DRILLING ANCHOR BOLT

FIELD OF THE INVENTION

The present invention relates to an anchor bolt setting device and setting method, in particular to a setting device and setting method for setting a self-drilling anchor bolt in a receiving material using an impact tool.

BACKGROUND

Self-drilling anchor bolts are a type of anchor bolt in which the anchor bolt itself can not only drill a hole but also achieve a fastening function, with no need to drill the hole separately. Generally, a self-drilling anchor bolt has a drill bit, capable of drilling a hole, at a top end of an anchor rod thereof; the drill bit adjoins an expansion part, and a sleeve surrounds a rear end of the anchor rod. After drilling a hole directly by means of the drill bit at the top end thereof, the sleeve is hammered so that it expands radially along the expansion part; thus, a surface of the sleeve forms a friction fit with an inner surface of the drilled hole, thereby fixing the anchor bolt in the drilled hole by friction.

Many methods are known for assisting in the setting of percussion anchor bolts. In particular, CN109963693A has described a setting device, which is suitable for setting self-drilling anchor bolts of the self-drilling type and self-drilling anchor bolts of the self-undercut type; the self-drilling anchor bolt has an internal expanding body. The setting device has an inner drive shaft which, at a rear side thereof, is coupled to an impact drill, and at a front side thereof, reacts against the expanding body of the self-drilling anchor bolt, in order to push the expanding body relative to the expanding sleeve of the self-drilling anchor bolt. In addition, the setting device has an outer drive shaft, which surrounds the inner drive shaft and, at a front side thereof, reacts against the expanding sleeve, so that the expanding sleeve is struck into a receiving material in a rotational manner or a rotational striking manner. The outer drive shaft and inner drive shaft are permanently rotationally coupled, such that in any stage of setting of the anchor bolt, rotational motion applied to the inner drive shaft by the impact drill can be transmitted from the inner drive shaft to the outer drive shaft and then from the outer drive shaft to the expanding sleeve. Thus, the expanding sleeve in particular can rotate with the aid of the same element, i.e. the outer drive shaft, in a first stage of a setting process and a second stage of the setting process; in the first stage, the self-drilling anchor bolt drills into the receiving material in a self-drilling fashion, and in the second stage, the self-drilling anchor bolt expands in a self-undercutting fashion. Based on the axial moveability, it is possible for the expanding body in close contact with the inner drive shaft to be loaded in an axial direction only with the aid of the impact drill by means of an axial load of the inner drive shaft in the second stage of the setting process, with the expanding sleeve remaining unloaded in the axial direction; the result is that the expanding body is struck forward into a region of a narrowed part of an expansion channel relative to the expanding sleeve, and the expanding sleeve can thus expand radially.

SUMMARY OF THE INVENTION

However, in the setting device disclosed in the above-mentioned patent, although the two drive shafts are axially disengaged in the second stage of the setting process, the two drive shafts are still rotationally coupled, and the expanding sleeve rotates around a longitudinal axis thereof by means of the impact drill at the same time as the expanding sleeve expands radially; the result is that the receiving material is scraped rotationally at the circumference of the expanding sleeve in order to produce an undercut part in the receiving material. That is to say, throughout the setting process, the drill bit at the bottom is continuously driven to rotate, and this is not an ideal state from the point of view of the self-drilling anchor bolt; the continuous rotation of the anchor rod will affect the contact between the expanding sleeve and a hole wall, resulting in a poor fastening result or even failure. We desire that after drilling is complete, the anchor bolt can stop in the hole, the expanding sleeve is hammered into the drilled hole, and through the pressing of the expansion part, the expanding sleeve forms a close friction fit with the hole wall.

An object of the present invention is to provide a setting device for a self-drilling anchor bolt and a method for setting a self-drilling anchor bolt, wherein the two stages of self-drilling anchor bolt drilling and expansion are completed consecutively without any need to switch the operating mode of an impact tool, such that a good load value can be obtained simply at a very low cost, with very good operability and high reliability.

In the setting device for a self-drilling anchor bolt according to the present invention, one end of an anchor rod of the self-drilling anchor bolt has a drill bit, with an expansion part adjoining the drill bit, and a sleeve surrounding another end of the anchor rod, the setting device comprising: a drive shaft, one end thereof having a shank for connecting to an impact tool, and another end being a setting part for pushing the self-drilling anchor bolt axially, the setting part having a setting hole for accommodating the anchor rod, a hole wall thereof surrounding the anchor rod outside a sleeve part of the self-drilling anchor bolt, and an annular extremity of the setting part abutting the sleeve; a coupling, partially surrounding the drive shaft along an axis, and being supported on the drive shaft in such a way as to be incapable of relative rotation while being axially moveable at least locally, the coupling having a first inner diameter region substantially equal to the outer diameter of the drive shaft, and a second inner diameter region larger than the outer diameter of the drive shaft; and a releasable locking component, disposed between the drive shaft and the coupling; in a locked position, the locking component is coupled to an extremity of the anchor rod such that the anchor rod is fed axially with rotational striking into a receiving material, and in a released position, the annular extremity of the setting part strikes the sleeve to advance axially along the anchor rod and expand at the expansion part.

The setting device of the present invention allows quick setting of the self-drilling anchor bolt; the self-drilling anchor bolt has the anchor rod with the drill bit, and the coupling of the locking component of the setting device with the anchor rod enables rotational motion applied to the drive shaft by an impact drill to be transmitted from the drive shaft to the anchor rod at the same time as striking motion, such that the drill bit of the anchor rod can drill a hole in the receiving material—this is a first stage of the setting method of the present invention. In a second stage, the locking component moves from the locked position to the released position, whereby a locking tongue component is no longer coupled to the anchor rod, thereby removing the rotational striking motion applied to the anchor rod. The annular extremity of the setting part of the drive shaft still abuts the sleeve of the self-drilling anchor bolt, and even though the impact tool still continuously outputs rotational striking motion, in the second stage the drive shaft only transfers striking motion to the sleeve by means of the annular extremity of the setting part abutting the sleeve of the self-drilling anchor bolt, with the anchor rod of the self-drilling anchor bolt being unloaded along the axis; the result is that the sleeve advances in the axial direction relative to the anchor rod, the front end of the sleeve then reaches the expansion part of the anchor rod, and the sleeve expands radially at the expansion part, forming a close friction fit with a hole wall, to fasten the self-drilling anchor bolt in the receiving material.

According to an embodiment of the present invention, the locking component comprises at least one radially moveable slider, the slider having at least one locking tongue that is shape-fitted to the anchor rod extremity; in the locked position, the slider is confined in at least one opening of the hole wall of the setting part of the drive shaft by the first inner diameter region of the coupling, and in the released position, the slider slides radially outwards in the opening until it is restricted by the second inner diameter region of the coupling, and the locking tongue is separated from the anchor rod extremity. With the provision of the releasable locking component, the locking component is locked during the first stage of the setting method of the present invention, and by means of the locking of the locking component in the locked state thereof, the anchor rod extremity of the self-drilling anchor bolt can be temporarily coupled in a fixed manner, and axial impacts applied by the impact tool to the drive shaft can be transmitted from the drive shaft to the anchor rod extremity and then from the anchor rod extremity to the drill bit, such that the drill bit of the self-drilling anchor bolt can be driven with rotational striking in the first stage of the setting method; this also enables the self-drilling anchor bolt to drill holes very effectively in hard receiving materials. In the second stage of the setting method, immediately following the first stage, the locking component is released and thus the coupling of the locking tongues with the anchor rod extremity is released; at the same time, the annular extremity of the setting part still maintains a state of abutment with the expanding sleeve of the self-drilling anchor bolt, and the result is that the axial impacts of the drive shaft, applied to the drive shaft by the impact tool, are transmitted from the annular extremity of the setting part thereof to the expanding sleeve; the axial striking motion pushes the sleeve to advance axially relative to the anchor rod, until the sleeve reaches the expansion part, at which time the front end of the expanding sleeve expands radially along the expansion part.

Preferably, the slider comprises a pair of opposite side faces and an outer peripheral face parallel to an axis, and opposite the outer peripheral face comprises a substantially semicircular first face and a substantially planar second face, and a semicircular face extending from the first face to the second face in such a way as to be substantially perpendicular to the axis. The inner diameter of the semicircular first face is substantially equal to the outer diameter of the anchor rod extremity, and the locking tongue is located on the first face. Two said sliders are provided, arranged in the opening in a radially symmetric fashion. The releasable slider achieves switching between the locked state and released state of the locking component very simply; this can further reduce structural costs and production costs, and can also further increase reliability.

Preferably, the locking component further comprises a resetting element which limits radial movement thereof, a sidewall of the coupling is provided with at least one slide groove extending axially from the first inner diameter region to the second inner diameter region, and the resetting element slides along the slide groove. Preferably, a fixed connection between the resetting element and the slider is for example a threaded connection; thus, axial sliding of the resetting element in the slide groove and axial movement of the drive shaft relative to the coupling are in unison. The slide groove in the coupling is used for switching the locking component from the locked position to the released position; in the course of relative axial movement of the drive shaft and the coupling, the drive shaft drives the slider to advance together with it along the slide groove, until the slider reaches the second inner diameter region having a larger radial space, at which time the slider is released with the aid of a spring mechanism of the resetting element. Furthermore, when the second stage of the setting method has ended, the resetting element enables the setting device to return to its initial state, for use in another setting process. Automatic release of the locking apparatus can thus be achieved very simply and reliably when the transition from the first stage of the setting method to the second stage takes place.

The drive shaft is provided with a thread at a segment behind the coupling, and has a nut screwed thereon; a spring is mounted between the nut and the coupling, to limit axial forward movement of the drive shaft relative to the coupling. The spring between the nut on the drive shaft and a rear end face of the coupling enables the coupling to return to its initial position, i.e. the first inner diameter region of the coupling can limit sliding in the opening.

The drive shaft has at least one indicator line thereon, for showing the travel of axial advance of the drive shaft. Preferably, two indicator lines are included; one of these indicates completion of a first stage of the setting method of the present invention, and the other indicates completion of a second stage of the setting method of the present invention.

In addition, the present invention relates to a setting method for fastening a self-drilling anchor bolt in a receiving material, one end of an anchor rod of the self-drilling anchor bolt having a drill bit, with an expansion part adjoining the drill bit, and a sleeve surrounding another end of the anchor rod, the setting method comprising:
  in a first stage, causing the anchor rod of the self-drilling anchor bolt to drill a hole in the receiving material;
  in a second stage, causing the expanding sleeve of the self-drilling anchor bolt to continue to be fed axially so as to expand at the expansion part, wherein the first stage and the second stage are carried out by means of the abovementioned setting device.

Preferably, the first stage and second stage are consecutive.

Thus, a setting device and setting method are provided by the present invention; with the aid of the setting device, the self-drilling anchor bolt can be drilled into the receiving material, and expand in the drilled hole to anchor the self-drilling anchor bolt in the receiving material. Speaking precisely, this is carried out in a continuous setting method, in which there is no need to switch between setting devices; thus, the setting method is very simple, has a very small number of steps and/or tools, and can be implemented very reliably. Based on the manner in which the self-drilling anchor bolt is arranged in the drilled hole, a very good load value can be achieved for this.

BRIEF DESCRIPTION OF THE FIGURES

The embodiments mentioned can be better understood through the following detailed description while perusing the accompanying drawings. It is emphasized that the various components are not necessarily drawn to scale. In fact, dimensions can be enlarged or reduced at will for the purposes of clear discussion. In the drawings, identical reference labels denote identical elements.

DETAILED DESCRIPTION

Figure 1:
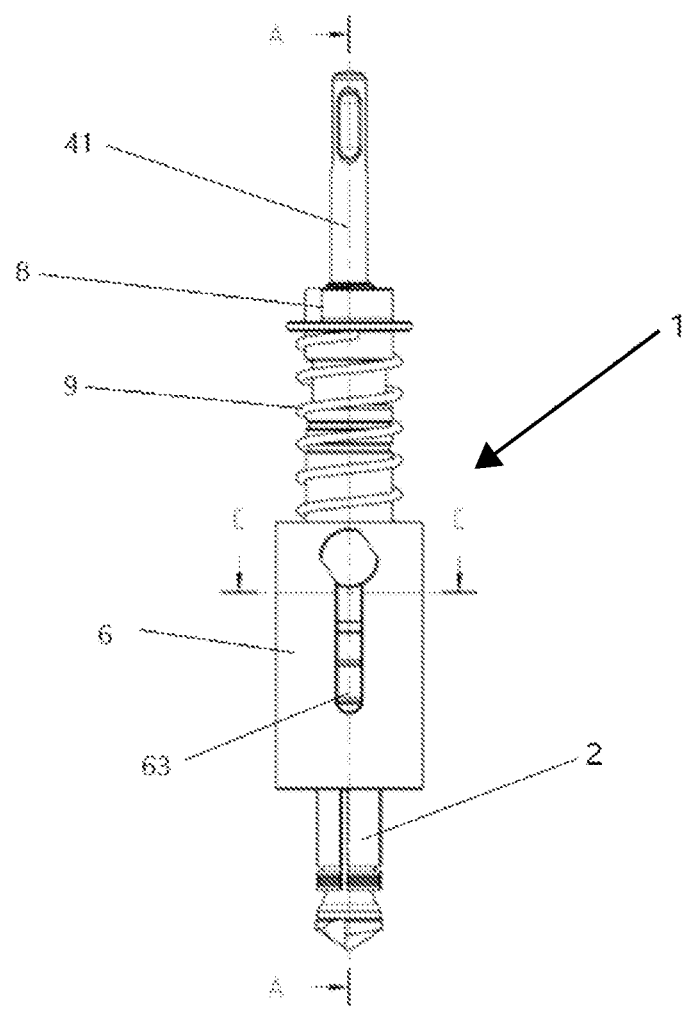
FIG. 1 is a schematic drawing of the self-drilling expanding anchor bolt of the present invention.

The embodiments mentioned can be better understood through the following detailed description while perusing the accompanying drawings. It is emphasized that the various components are not necessarily drawn to scale. In fact, dimensions can be enlarged or reduced at will for the purposes of clear discussion. In the drawings, identical reference labels denote identical elements.

Radial, axial and/or circumferential directions, and rotation, are mentioned herein; these should in particular relate to longitudinal axes of the drive shaft and the coupling, i.e. preferably relate to an axis of coaxial arrangement of the drive shaft and the coupling. The direction descriptions "front", "rear" and "rear part" as used herein should uniformly relate to the same axis, wherein this axis may in particular be the longitudinal axis of the drive shaft, and the direction in which the self-drilling anchor bolt is pushed axially into the receiving material is defined as "forwards" or "front".

Figure 2:
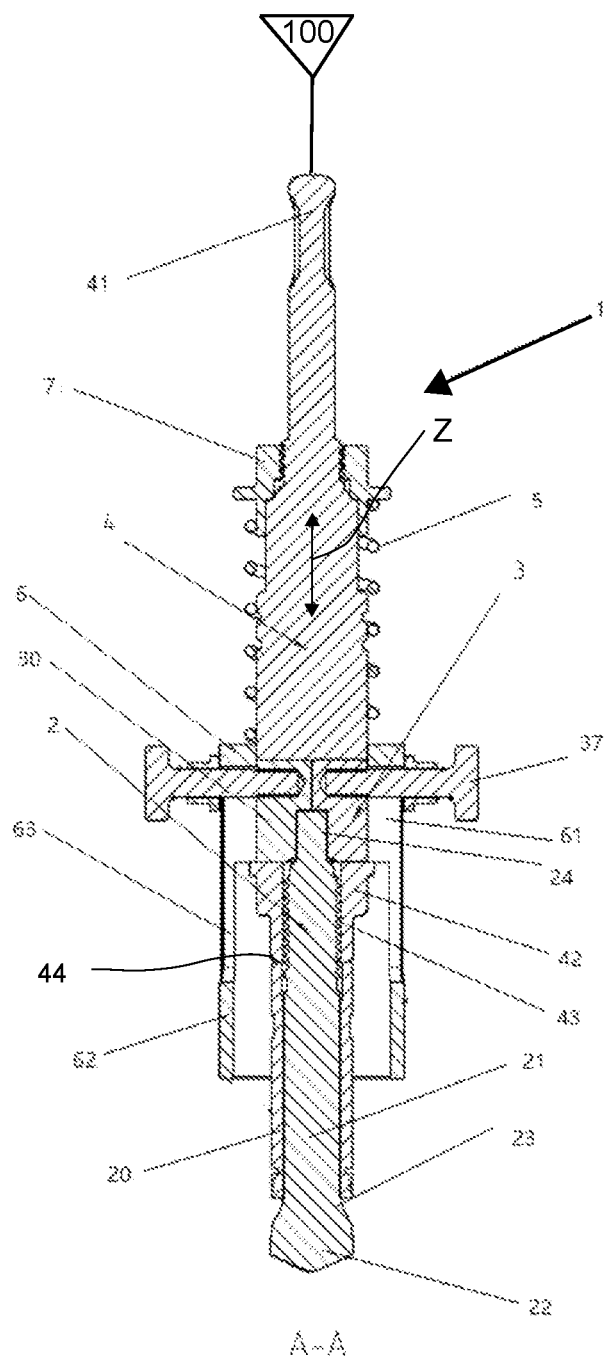
FIG. 2 shows the setting device in FIG. 1 as a longitudinal sectional view A-A based on FIG. 1.

FIGS. 1 and 2 show a setting device 1 for a self-drilling anchor bolt 2 according to the present invention. First of all, the self-drilling anchor bolt 2 of the present invention comprises an axially extending anchor rod 21 (see, e.g., FIG. 2); one end of the anchor rod has a drill bit 22, with an expansion part 23 adjoining the drill bit, and a sleeve 20 surrounds another end of the anchor rod. With the self-drilling anchor bolt according to the present invention, there is no need to drill a hole in a receiving material 3 beforehand; the anchor bolt's own drill bit is used to drill the hole and then the sleeve expands in the drilled hole, pressing against the hole wall, thereby achieving a close friction fit with the hole wall's shape, and the self-drilling anchor bolt 2 is thus fastened in the receiving material 3 (see, e.g., FIG. 4). The receiving material 3 is preferably formed of a mineral construction material, in particular concrete.

The setting device 1 of the present invention is used to set the self-drilling anchor bolt 2 in the receiving material 3. The setting device 1 has a drive shaft 4 and a coupling 6, wherein the coupling 6 surrounds the drive shaft 4 (see, e.g., FIG. 2) in a front region of the drive shaft 4. Especially preferably, the drive shaft is at least partially a hollow shaft. One end of the drive shaft 4 has a shank 41 for connecting to an impact tool 100 shown solely schematically in FIG. 2; another end is a setting part 42 for pushing the self-drilling anchor bolt axially, i.e. a setting part 42 having an internal, in particular axially extending channel. The setting part 42 has a setting hole 43 for accommodating the anchor rod; a hole wall thereof surrounds the anchor rod outside the sleeve 20 part of the self-drilling anchor bolt, and an annular extremity 44 of the setting part abuts the sleeve 20 (see also FIG. 4).

The coupling 6 is arranged on the drive shaft 4 in such a way as to be moveable within a certain range along an axis, i.e. in a direction parallel to a longitudinal axis Z. As shown in FIGS. 1 and 2, the coupling 6 is substantially a cylinder having a through-hole; within the through-hole, the coupling has a first inner diameter region 61 substantially equal to the outer diameter of the drive shaft, and a second inner diameter region 62 larger than the outer diameter of the drive shaft, such that the coupling 6 substantially surrounds the drive shaft 4 circumferentially in the first inner diameter region 61, with the coupling and the drive shaft being moveable relative to each other in the axial direction but unable to rotate relative to each other. In the second inner diameter region 62, there is a certain gap between an inner peripheral surface of the coupling 6 and an outer peripheral surface of the drive shaft 4, because the inner diameter of the through-hole in this part of the coupling 6 is larger than the outer diameter of the drive shaft. Furthermore, a sidewall of the coupling 6 is further provided with at least one slide groove 63; preferably, there are two slide grooves, arranged in a radially symmetric fashion. At least one of the slide grooves 63 extends from the first inner diameter region 61 to the second inner diameter region 62 in the axial direction, i.e. a sliding direction of the slide groove is parallel to the direction of the longitudinal axis Z.

Figure 3:
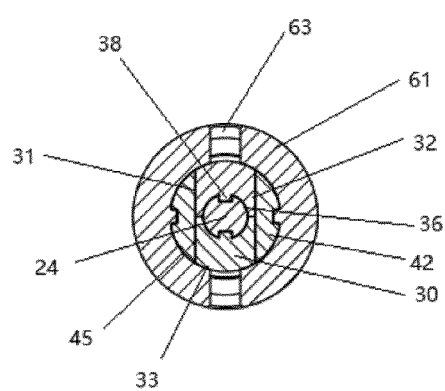
FIG. 3 shows the setting device in FIGS. 1 and 2 as a cross-sectional view C-C based on FIG. 1.

The setting device 1 also has a releasable locking component 3, disposed between the drive shaft 4 and the coupling 6. The locking component comprises at least one slider 30; preferably, there are two sliders, arranged in a radially symmetric fashion. A rear end of the setting part 42 of the drive shaft 4 is provided with an opening 45; the slider is accommodated in the opening, and moveable in the opening 45 in a radial direction. Preferably, the opening is a penetrating rectangular channel. Referring to FIGS. 2 and 3, the slider 30 comprises a pair of opposite side faces 31, 32 and an outer curved surface 33; the outer diameter of the outer curved surface 33 is substantially equal to the first inner diameter of the coupling 6. That side of the slider 30 which faces the axial direction comprises a semicircular first face 34, a substantially planar second face 35, and a semicircular face 36 extending from a rear end of the first face 34 to a front end of the second face 35. (See, e.g, FIG. 6). The radius of the semicircle of the first face 34 is substantially equal to the radius of an anchor rod extremity 24 of the self-drilling anchor bolt to be set; the second face 35 is a flat surface extending in the axial direction from two ends of the semicircle of the first face. Preferably, when there are two sliders arranged in a radially symmetric fashion, the two opposite first faces 34 form a round hole in which the anchor rod extremity 24 is clamped, the two opposite second faces 35 abut each other at the axis, and the two semicircular faces 36 form a bottom face of the round hole, limiting axial movement of the anchor rod extremity 24. A locking tongue 38 protruding towards the axis is provided at the first face 31, the locking tongue 38 being connected to the anchor rod extremity in a shape-fitting fashion; thus, the anchor rod extremity 24 is clamped in the round hole formed by the first faces, and at the same time. Preferably, the locking tongue is a rib, and the anchor rod extremity is provided with a slot; when the rib extends into the slot, the anchor rod extremity 24 is locked to the slider 30 of the locking component. The slider 30 is located at a locked position in the drive shaft, at which time, a rotational impact of the impact tool can be transferred to the anchor rod extremity, such that the drill bit at a front end of the anchor rod drills a hole in the receiving material 3 under the action of a rotational striking force.

Preferably, the opening 45 in the drive shaft 4 is substantially a rectangular channel, and the slider 30 can move in a radial direction in the opening. The slider 30 is further connected to a resetting element 37; in this embodiment, the resetting element 37 is a spring, and has a reset button protruding to the outside of the coupling 6. The resetting element 37 extends from a slide groove of the coupling 6, and slides in the slide groove as the coupling and drive shaft move relative to each other axially. The slider 30 can be moved inwards in a radial direction by means of the resetting element 37, to return the slider 30 to an initial position.

The drive shaft 6 is provided with a thread at a rear segment, and has a nut 7 screwed thereon (see, e.g., FIG. 2); a spring 5 is mounted between the nut and the coupling, so that the coupling 6 stays in or returns to an initial position thereof.

Preferably, the drive shaft has at least one indicator line thereon, for showing the travel of axial advance of the drive shaft. Preferably, two indicator lines are included; one of these indicates completion of a first stage of the setting method of the present invention, and the other indicates completion of a second stage of the setting method of the present invention.

FIGS. 2-6 show the setting device 1 in different consecutive stages of the setting method according to the present invention. In particular, FIG. 2 shows the state of the setting device 1 when the first stage of the setting method begins. In this state, the locking component is in a locked position with the sliders 30 thereof, i.e. the sliders 30 are completely restricted by an inner wall of the first inner diameter region 61 of the coupling 6 so as to be located in the opening of the drive shaft; the two sliders are opposite each other radially, and the anchor rod extremity 24 is clamped, by means of the locking tongues 38, in the round hole formed by the first faces 34. The resetting elements of the locking component are located at a rearmost end of the slide groove of the coupling 6.

At this time, the setting device 1 is placed on the receiving material at a front side of the coupling 6 thereof. Preferably, there is a dust suction apparatus between the front side of the coupling and the receiving material, for sucking out dust and accumulated debris produced in the self-drilling process.

The drive shaft 4 performs rotational striking motion with the aid of an impact drill. The rotational motion of the drive shaft 4 is transferred to the anchor rod via the locking tongues 38 of the sliders; forward striking motion of the drive shaft 4 is transferred to the anchor rod 21 via the semicircular faces 36 of the sliders 30. Thus, in the first stage of the setting method, the self-drilling anchor bolt 2 drills into the receiving material 3 by means of the rotational striking motion of the setting device 1.

Figure 4:
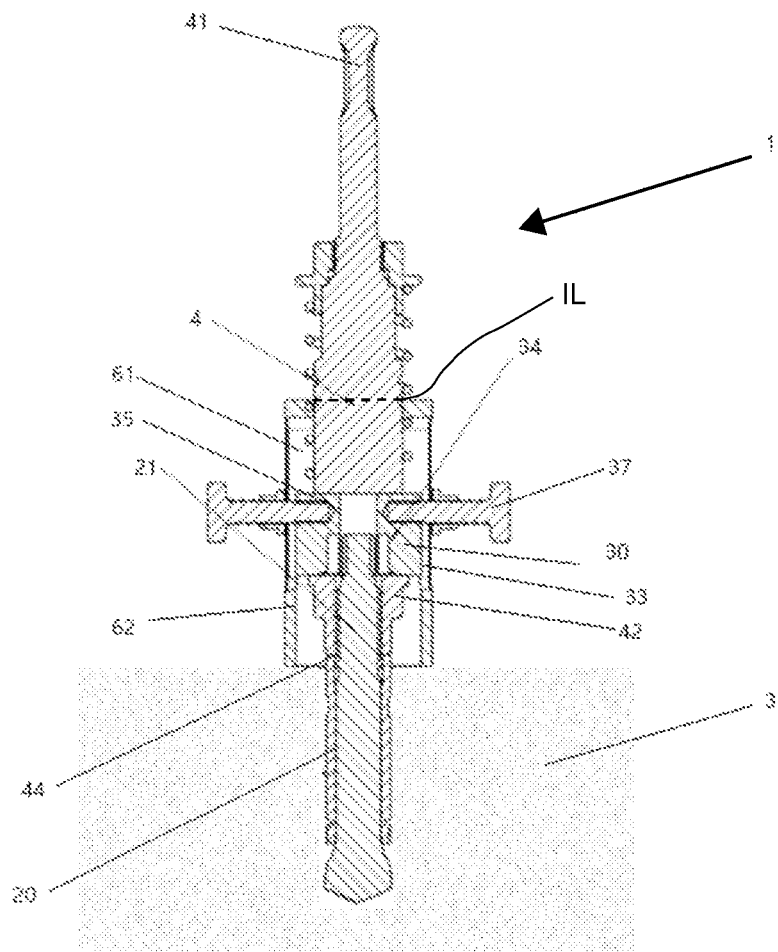
FIG. 4 shows a detailed longitudinal sectional drawing of the setting device of the present invention at the transition between the first stage and second stage of the setting method according to the present invention.

As shown in FIG. 4, when the self-drilling anchor bolt 2 drills into the receiving material 3, since the front side of the coupling 6 is placed on the receiving material 3, i.e. the coupling 6 does not move relative to the receiving material 3, the drive shaft 4 moves forward in the axial direction relative to the coupling under the rotational striking action of the impact tool, and the sliders 30 are confined in the opening 45 of the drive shaft by the first inner diameter region 61 of the coupling in the abovementioned first stage, i.e. are in the locked position. When drilling reaches the desired depth, the indicator line IL (shown solely schematically as FIG. 4 is a cross sectional view) of the drive shaft 4 is located precisely at a rear end face of the coupling 6, at which time a rear end of the rectangular opening of the drive shaft 4 reaches an edge of the first region; since the second inner diameter region 62 has a larger inner diameter than the first inner diameter region 61, the sliders 30 slide outwards radially along the opening under the action of the resetting elements 37, until the sliders again abut an inner wall of the second inner diameter region 62 of the coupling. The movement of the sliders causes the locking tongues 38 to disengage from the anchor rod extremity 24, so the rotational motion of the drive shaft 4 can no longer be transferred to the anchor rod 21 via the locking tongues 38 of the sliders; the movement of the sliders also results in the semicircular faces 36 being offset radially from the anchor rod extremity 24, and unable to transfer the striking motion of the drive shaft to the anchor rod 21. At this point, the drilling step of the self-drilling anchor bolt is completed. Thus, the first stage of the setting method of the present invention automatically ends and the second stage begins.

Figure 5:
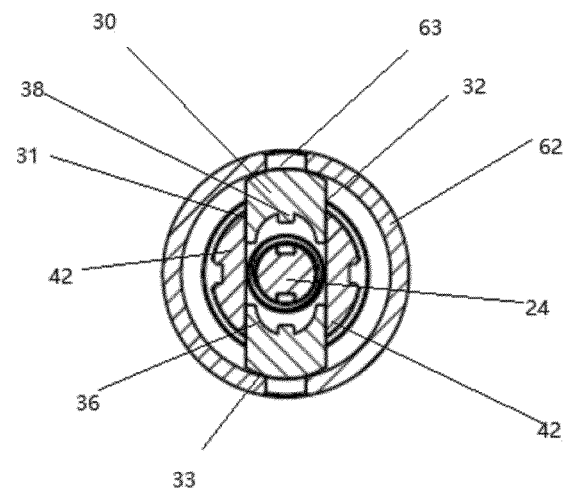
FIG. 5 shows a cross-sectional view C-C of the setting device operating state shown in FIG. 4.
Figure 6:
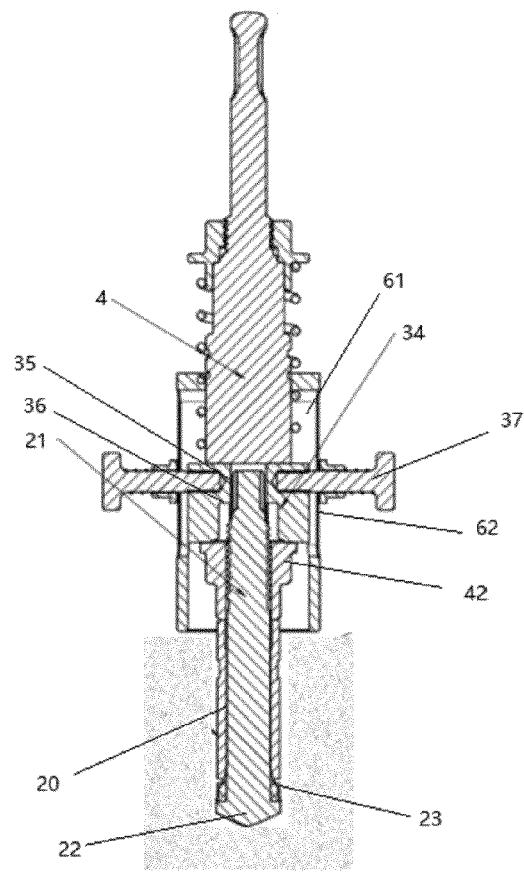
FIG. 6 shows a detailed longitudinal sectional drawing of the setting device of the present invention at the end of the second stage of the setting method according to the present invention.

In the second stage, as shown in FIGS. 5 and 6, the drive shaft 4 loaded by the impact drill still executes a rotational striking motion; at this time, the locking component is in a released position, and the anchor rod 21 is no longer subject to rotational or impact driving. However, since the annular extremity 44 of the setting part of the drive shaft always abuts the sleeve, the annular extremity 44 can still transfer striking motion of the drive shaft 4 to the expanding sleeve 20 of the self-drilling anchor bolt. Thus, in the self-drilling anchor bolt 2, only the sleeve 20 is subjected to striking motion in the second stage; the anchor rod 21 stays substantially stationary in the drilled hole, and the sleeve 20 is struck forwards axially until a front end of the sleeve 20 reaches the expansion part connected to the drill bit; the sleeve 20 is expanded radially and abuts the hole wall, forming a close friction fit with the hole wall, and the self-drilling anchor bolt is thereby fastened in the receiving material.

Thus, with the provision of the releasable locking component, the locking component is locked during the first stage of the method of the present invention, and by means of the locking of the locking component in the locked state thereof, the anchor rod extremity of the self-drilling anchor bolt can be temporarily coupled in a fixed manner, and axial impacts applied by the impact tool to the drive shaft can be transmitted from the drive shaft to the anchor rod extremity and then from the anchor rod extremity to the drill bit, such that the drill bit of the self-drilling anchor bolt can be driven with rotational striking in the first stage of the setting method; this also enables the self-drilling anchor bolt to drill holes very effectively in hard receiving materials. In the second stage of the setting method, immediately following the first stage, the locking component is released and thus the coupling of the locking tongues with the anchor rod extremity is released; at the same time, the annular extremity of the setting part still maintains a state of abutment with the expanding sleeve of the self-drilling anchor bolt, and the result is that the axial impacts of the drive shaft, applied to the drive shaft by the impact tool, are transmitted from the annular extremity of the setting part thereof to the expanding sleeve; the axial striking motion pushes the sleeve to advance axially relative to the anchor rod, until the sleeve reaches the expansion part, at which time the front end of the expanding sleeve expands radially along the expansion part. By means of the setting device 1 according to the present invention, it is possible to produce a drilled hole, set the self-drilling anchor bolt 2 and accomplish expansion by a continuous setting method. In this regard, the setting depth and degree of expansion are ensured by means of the setting device 1, thus affording a very high level of user satisfaction and reliability.

To enable the setting device 1 to return to its initial state to be used for another setting after the second stage of the setting method ends, in addition to pushing the sliders back into the opening of the drive shaft by means of the resetting elements of the locking component, it is also necessary to utilize the spring between the nut on the drive shaft and the rear end face of the coupling, so that the coupling can also return to its initial position, i.e. the first inner diameter region of the coupling can limit sliding in the opening.

Furthermore, the present invention further relates to a setting method for the self-drilling anchor bolt; the present invention relates to a method for setting a self-drilling anchor bolt in a receiving material; one end of an anchor rod of the self-drilling anchor bolt has a drill bit, with an expansion part adjoining the drill bit, and a sleeve surrounds another end of the anchor rod; the setting method comprises:
    in a first stage, causing the anchor rod of the self-drilling anchor bolt to drill a hole in a receiving material;
    in a second stage, causing the expanding sleeve of the self-drilling anchor bolt to continue to be fed axially so as to expand at the expansion part, wherein the first stage and the second stage are carried out by means of the abovementioned setting device.

Preferably, the first stage and second stage are consecutive.

Finally, the present invention further relates to the combination of the self-drilling anchor bolt according to the present invention and the setting device according to the present invention. In particular, the self-drilling anchor bolt according to the present invention can be set very effectively by means of the setting device according to the present invention and/or by the setting method according to the present invention.

Features mentioned in conjunction with the setting device according to the present invention, the setting method according to the present invention, the self-drilling anchor bolt according to the present invention and the combination according to the present invention should be able to be combined freely here; thus, features mentioned in conjunction with the setting device according to the present invention for example may also be applied in the setting method according to the present invention.

As stated above, although demonstrative embodiments of the present invention have already been explained herein with reference to the accompanying drawings, the present invention is not limited to the particular embodiments described above; many other embodiments are possible, and the scope of the present invention should be defined by the claims and their equivalent meaning.

What is claimed is:

1. A setting device for a self-drilling anchor bolt, one end of an anchor rod of the self-drilling anchor bolt having a drill bit, with an expansion part adjoining the drill bit, and a sleeve surrounding another end of the anchor rod, the setting device comprising:
    a drive shaft, one end thereof having a shank for connecting to an impact tool, and another end being a setting part for pushing the self-drilling anchor bolt axially, the setting part having a hole for accommodating the anchor rod, a hole wall thereof surrounding the anchor rod outside the sleeve of the self-drilling anchor bolt, and an annular extremity of the setting part abutting the sleeve;
    a coupling, partially surrounding the drive shaft along an axis, and being supported on the drive shaft in such a way as to be incapable of relative rotation while being axially moveable at least locally, the coupling having a first inner diameter region substantially equal to the outer diameter of the drive shaft, and a second inner diameter region larger than the outer diameter of the drive shaft; and
    a releasable lock, wherein, in a locked position, the lock is coupled to an extremity of the anchor rod such that the anchor rod is fed axially with rotational striking into a receiving material, and in a released position, the annular extremity of the setting part strikes the sleeve to advance axially along the anchor rod and expand at the expansion part and wherein the lock includes at least one radially moveable slider, the slider having at least one locking tongue shape-fitted to the anchor rod extremity; in the locked position, the slider being confined in at least one opening of the hole wall of the setting part of the drive shaft by the first inner diameter region of the coupling, and in the released position, the slider slides radially outwards in the opening until restricted by the second inner diameter region of the coupling, and the locking tongue is separated from the anchor rod extremity.

2. The setting device as recited in claim 1 wherein the slider includes a pair of opposite side faces and an outer peripheral face parallel to an axis, and opposite the outer peripheral face includes a semicircular first face and a planar second face, and a semicircular face extending from the first face to the second face in such a way as to be perpendicular to the axis.

3. The setting device as recited in claim 2 wherein the inner diameter of the semicircular first face is equal to the outer diameter of the anchor rod extremity, and the locking tongue is located on the first face.

4. The setting device as recited in claim 3 wherein the at least one radially movable slider includes two sliders arranged in the opening in a radially symmetric fashion.

5. The setting device as recited in claim 1 wherein the lock further includes a resetting element limiting radial movement thereof, a sidewall of the coupling having at least one slide groove extending axially from the first inner diameter region to the second inner diameter region, and the resetting element slides along the slide groove.

6. The setting device as recited in claim 5 wherein the drive shaft has a thread at a segment behind the coupling, and has a nut screwed thereon; a spring being mounted between the nut and the coupling, to limit axial forward movement of the drive shaft relative to the coupling.

7. The setting device as recited in claim 6 wherein the drive shaft has at least one indicator line thereon for showing the travel of axial advance of the drive shaft.

8. The setting device as recited in claim 1 wherein the locking tongue is a rib.

9. The setting device as recited in claim 1 wherein the opening in the drive shaft is a rectangular channel, and the slider is movable in the radial direction in the opening.

10. A method for setting a self-drilling anchor bolt in a receiving material, one end of an anchor rod of the self-drilling anchor bolt having a drill bit, with an expansion part adjoining the drill bit, and a sleeve surrounding another end of the anchor rod, the setting method comprising:
    in a first stage, causing the anchor rod of the self-drilling anchor bolt to drill a hole in the receiving material;
    in a second stage, causing the expanding sleeve of the self-drilling anchor bolt to continue to be fed axially so as to expand at the expansion part, wherein the first stage and the second stage are carried out via the setting device as recited in claim 1.

11. The setting method as recited in claim 10 wherein the first stage and second stage are consecutive.

\* \* \* \* \*